Patented Nov. 12, 1940

2,220,954

UNITED STATES PATENT OFFICE 2,220,954

WELD ROD COATING

Edward C. Chapman, Lookout Mountain, Tenn., assignor to Combustion Engineering Company, Inc., New York, N. Y., a corporation of Delaware No Drawing. Application December 9, 1939, Serial No. 308,430

5 Claims. (Cl. 219—8)

This invention relates to weld rod coatings, especially coatings for carbon steel weld rods used in electric arc welding processes.

In considering the nature, objects and advantages of the invention it is first mentioned that weld rod coatings must be relied upon in welding operations to supply certain materials to the region of weld, in the absence of which materials a satisfactory weld is very difficult, if not impossible, to produce. There are, in fact, a wide variety of conditions which should preferably be maintained at or close to the region of weld, in order to obtain high quality work. Because of this wide diversity and large number of requirements, it has been difficult to provide a coating satisfying all of them. In certain prior coatings a number of the requirements were met, while others were not; and in certain prior coatings the materials employed to satisfy some of the requirements impaired the weld or the welding operation in other respects.

The primary object of the present invention is the provision of a coating which effectively satisfies an unusually large number and favorable combination of the requirements.

More specifically, the invention affords the following important advantages:

It provides a non-oxidizing gas at the weld which serves to exclude oxygen and nitrogen of the air and thus aids in protecting the metal during its passage through the arc and while it is in a molten condition.

It provides a deoxidizer which aids in protecting the arc, serves to reduce oxides of iron for metal purification and to replenish the manganese of the original core material which is lost in the arc and the metal pool due to oxidation.

It further provides materials serving to ionize and stabilize the arc, which is of benefit for several reasons, including the fact that striking (starting) the arc is made easier, and the arc is more difficult to extinguish, as a result of which fewer accidental arc interruptions occur.

According to the invention, moreover, the materials serving to ionize and stabilize the arc are also so balanced as to make the coated electrode suitable for use on both straight and reversed polarity, as well as for use with alternating current. Variation in the proportions of these materials further provides for control of the rate of melting or rod consumption, as well as of arc penetration. As to these materials, moreover, the invention provides relative proportions such as to give maximum melting or deposition rate without loss of penetrating power.

The balance or proportions of materials employed is also effective to reduce loss of metal by sparking and splattering.

The coating of the present invention further incorporates fluxing materials adapted to assist in removing injurious oxides from the molten weld metal before solidification, and to protect the arc and pool from the air before solidification. The fluxing material is also of importance since it facilitates proper shaping of the weld bead by control of its freezing rate and also by covering the bead before solidification. These functions of the fluxing materials may be controlled by varying the melting point, viscosity, and surface tension of the slag. In this connection it should be borne in mind that in balancing the fluxing materials of the coating for electrodes adapted for use in all positions, the slag properties (such as melting temperature, viscosity and surface tension) are more critical than the same properties in slags for welding in the "downhand" position only, since, for other positions, these properties must lie within narrower limits for best operation.

By satisfying the foregoing requirements, which, it will be noted, are numerous and of widely divergent types, the present invention provides a coating which very materially improves the weld and the welding operation.

The invention also contemplates other objects and advantages, including the provision of a coating answering the important points above, which coating, at the same time, is composed of materials which may economically be used and which readily mix with a suitable binder for bonding the coating, thereby permitting convenient application of the coating by the extrusion process.

Still further, the coating of the invention is of such physical characteristics as to permit of a reasonable degree of bending of the coated rod without cracking the coating. Moreover, after drying, the coating does not readily flake in handling and does not absorb substantial moisture in damp atmosphere.

To achieve the foregoing objects and advantages, the improved coating of this invention is preferably made up of the following materials, in quantities within the limits indicated:

| | Parts by weight |
|---|---|
| Potassium feldspar | 7-15 |
| Organic material | 2-10 |
| Calcium carbonate | 4-10 |
| Clay | 4-10 |
| Ferromanganese | 4-10 |
| Sodium silicate | 10-25 |
| Titanium dioxide | 30-50 |

While it may not always be essential, I prefer also to employ, in combination with the foregoing—

| | Parts by weight |
|---|---|
| Talc | 1-15 |
| Asbestos | 1-10 |

Briefly, the foregoing materials contribute to the following and other favorable characteristics of my improved coating:

Potassium feldspar is beneficial for arc stabilization and serves to increase the silica content of the slag.

Talc and asbestos both serve to furnish magnesium silicate, which is also of importance as a slag forming ingredient. The asbestos has a further beneficial effect, because of its fibrous nature, in strengthening the coating mechanically, and in reducing flaking and cracking in handling.

The organic material is of considerable importance, primarily as an effective agent for arc protection, and secondarily for strengthening the coating mechanically, which secondary object is achieved to best advantage when the organic material is of fibrous nature, as is preferred.

Calcium carbonate is useful as an arc stabilizer, especially when welding with straight polarity and in alternating current welding. The calcium carbonate further supplies $CO_2$ gas when heated at the weld and this serves to protect the arc and is also beneficial in the slag, especially when employing the other slag forming ingredients in the proportions indicated.

By variation of the relative proportions of calcium carbonate and titanium dioxide, the melting rate of the electrode may be varied to give the most economical rate of metal deposition consistent with good welding technique.

Clay is desirable since its presence lends body to the coating material, and further since its water retaining properties aid in lubricating the mixture during extrusion of the coating with the rod to be coated.

Ferromanganese supplies manganese which is normally burned out in the welding process, and is of further benefit in improving metal protection and purification.

The sodium silicate constitutes the binder for bonding the materials of the coating.

Titanium dioxide is effective in ionization and stabilization of the arc, in increasing the melting rate of the electrode, and still further, in combination with other materials, in providing a satisfactory slag.

In considering the terms or definitions used above for the individual ingredients, the following should be noted:

It is preferred to use potassium feldspar having an approximated analysis of $K_2O$—12.5%, $Al_2O_3$—18%, and $SiO_2$—67%, this being an economical source of potassium oxide ($K_2O$) and silica ($SiO_2$), which are the active ingredients desired for arc stabilization and improvement of the slag.

For the organic material or materials any one of a variety of sources may be employed, such as the materials known commercially as Solka Flock, alpha cellulose, cellulose acetate, wood pulp, paper and cotton or cotton fibers. As already mentioned, the organic material used is preferably of fibrous texture.

As a source of calcium carbonate ($CaCO_3$) it is preferable to employ marble dust, since I have found that the carbonate in this form is not affected chemically by water and sodium silicate to the same degree as other forms of $CaCO_3$.

The use of the term ferromanganese is intended to refer to standard 80% ferromanganese.

Most any grade of sodium silicate is suitable as the binder. Potassium silicate may be used as a substitute and the quantity of binding agent employed should vary in accordance with the quantities of other materials incorporated, sufficient binder being added to give the mixture a dough-like consistency suitable for extruding.

The titanium dioxide, being present in relatively large quantities, is preferably introduced by employment of rutile, a mineral high in titanium dioxide. This mineral is a highly economical source of $TiO_2$.

While various advantages of the invention may be obtained within the ranges of materials indicated above, I have found that for maximum effectiveness in satisfying the wide diversity of requirements, the materials should preferably be employed within the following percentages:

| | Per cent |
|---|---|
| Potassium feldspar | 8-13 |
| Organic material | 2-10 |
| Calcium carbonate | 5-8 |
| Clay | 5-8 |
| Ferromanganese | 4-7 |
| Sodium silicate | 10-25 |
| Titanium dioxide | Balance |

In considering the above it is noted again that while not always essential, I prefer also to include small amounts of talc and asbestos.

The following is given by way of a specific and preferred example of the composition of a coating:

| | Parts by weight |
|---|---|
| Potassium feldspar | 8 |
| Talc | 6 |
| Organic material | 3 |
| Calcium carbonate | 4 |
| Clay | 5 |
| Asbestos | 2 |
| Ferromanganese | 6 |
| Sodium silicate | 13 |
| Titanium dioxide | 30 |

It is to be understood that in the foregoing table and also in the appended claims, reference to specific quantities of materials is intended only to be an approximation.

In accordance with the foregoing, a weld rod coating is provided, the said coating substantially improving the deposition of the weld metal in all positions, with the minimum amount of effort, the coating at the same time supplying ingredients performing important functions, especially arc protection and stabilization. The coating, moreover, particularly because of the content of organic material, has a high degree of crack and flake resistance; and because of the presence of various other ingredients, supplies fluxing materials of a character producing a highly satisfactory and effective weld.

With reference to the appended claims it should be noted that where "titanium dioxide" is referred to as constituting the "balance," certain small percentages of other ingredients may also be present, so long as they do not impair the characteristic properties of the coating. For instance, the coating may also contain small percentages of talc and asbestos.

I claim:

1. A weld rod coating composed of the following materials in the ranges indicated in parts by weight:

| | |
|---|---|
| Potassium feldspar | 7-15 |
| Organic material | 2-10 |
| Calcium carbonate | 4-10 |
| Clay | 4-10 |
| Ferromanganese | 4-10 |
| Sodium silicate | 10-25 |
| Titanium dioxide | 30-50 |

2. A weld rod coating composed of the following materials in the ranges indicated in parts by weight:

| | |
|---|---|
| Potassium feldspar | 7-15 |
| Talc | 1-15 |
| Organic material | 2-10 |
| Calcium carbonate | 4-10 |
| Clay | 4-10 |
| Asbestos | 1-10 |
| Ferromanganese | 4-10 |
| Sodium silicate | 10-25 |
| Titanium dioxide | 30-50 |

3. A weld rod coating composed of the following ingredients in the proportions indicated:

| | Per cent |
|---|---|
| Potassium feldspar | 8-13 |
| Organic material | 2-10 |
| Calcium carbonate | 5- 8 |
| Clay | 5- 8 |
| Ferromanganese | 4- 7 |
| Sodium silicate | 10-25 |
| Titanium dioxide | Balance |

4. A weld rod coating composed of the following ingredients in the proportions indicated:

| | Per cent |
|---|---|
| Potassium feldspar | 8-13 |
| Organic material | 2-10 |
| Calcium carbonate | 5- 8 |
| Clay | 5- 8 |
| Ferromanganese | 4- 7 | titanium dioxide and sodium silicate together constituting the balance, the sodium silicate being present in a quantity imparting a dough-like texture to the mixture suitable for extrusion.

5. A weld rod coating composed of the following materials in the quantities indicated in parts by weight:

| | |
|---|---|
| Potassium feldspar | 8 |
| Talc | 6 |
| Organic material | 3 |
| Calcium carbonate | 4 |
| Clay | 5 |
| Asbestos | 2 |
| Ferromanganese | 6 |
| Sodium silicate | 13 |
| Titanium dioxide | 30 |

EDWARD C. CHAPMAN.